US009105182B2

(12) United States Patent
Tomita et al.

(10) Patent No.: US 9,105,182 B2
(45) Date of Patent: Aug. 11, 2015

(54) COMMUNICATION SYSTEM AND PORTABLE MACHINE

(71) Applicants: Yosuke Tomita, Aichi (JP); Koji Takizawa, Aichi (JP)

(72) Inventors: Yosuke Tomita, Aichi (JP); Koji Takizawa, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 222 days.

(21) Appl. No.: 13/791,176

(22) Filed: Mar. 8, 2013

(65) Prior Publication Data

US 2013/0234827 A1 Sep. 12, 2013

(30) Foreign Application Priority Data

Mar. 8, 2012 (JP) ................................. 2012-052336

(51) Int. Cl.
*G08C 23/04* (2006.01)
*B60R 25/24* (2013.01)
*H04B 5/00* (2006.01)
*G08C 17/02* (2006.01)
*G06F 7/00* (2006.01)

(52) U.S. Cl.
CPC ................ *G08C 17/02* (2013.01); *G08C 23/04* (2013.01); *B60R 25/24* (2013.01); *G06F 7/00* (2013.01); *G08C 2201/40* (2013.01); *G08C 2201/50* (2013.01); *H04B 5/0031* (2013.01)

(58) Field of Classification Search
CPC ...... G06F 7/00; G08C 17/02; G07C 9/00309; G07C 5/008; H04B 5/0031; B60Q 1/00; H04M 1/6075; B60R 25/2009; B60R 25/2018; B60R 2325/205; B60R 25/24

USPC ......... 340/5.61, 5.64, 426.13, 425.5; 180/287
See application file for complete search history.

(56) References Cited

U.S. PATENT DOCUMENTS

| | | | | |
|---|---|---|---|---|
| 4,646,082 A | * | 2/1987 | Engel et al. ................... | 340/10.2 |
| 5,442,345 A | * | 8/1995 | Kwon ........................... | 340/7.37 |
| 5,504,415 A | * | 4/1996 | Podrazhansky et al. ...... | 320/118 |
| 5,965,996 A | * | 10/1999 | Arledge et al. ............... | 320/116 |
| 5,998,969 A | * | 12/1999 | Tsuji et al. .................... | 320/132 |

(Continued)

FOREIGN PATENT DOCUMENTS

| | | |
|---|---|---|
| JP | 06-131590 A | 5/1994 |
| JP | H11-241539 A | 9/1999 |

(Continued)

OTHER PUBLICATIONS

Patent Abstracts of Japan for Japanese Publication No. 2007-046395, publication date Feb. 22, 2007 (1 page).

(Continued)

*Primary Examiner* — Fekadeselassie Girma
(74) *Attorney, Agent, or Firm* — Osha Liang LLP (57) ABSTRACT

A communication system includes a portable machine having an identification code registered in a controlled object, the portable machine being capable of conducting wireless communications with the controlled object, and a portable terminal being capable of conducting noncontact wireless communications with the portable machine, wherein after noncontact wireless communications start between the portable machine and the portable terminal, the noncontact wireless communications are inhibited when a predetermined condition is satisfied, and then do not resume unless a specified instruction is given.

8 Claims, 7 Drawing Sheets

(56) References Cited

U.S. PATENT DOCUMENTS

| | | | |
|---|---|---|---|
| 6,252,376 B1* | 6/2001 | Nakamura et al. | 320/132 |
| 6,297,618 B2* | 10/2001 | Emori et al. | 320/132 |
| 6,437,539 B2* | 8/2002 | Olsson et al. | 320/118 |
| 6,472,985 B1* | 10/2002 | Bruwer | 340/541 |
| 6,617,961 B1* | 9/2003 | Janssen et al. | 340/5.8 |
| 6,762,588 B2* | 7/2004 | Miyazaki et al. | 320/116 |
| 6,870,458 B2* | 3/2005 | Caren | 340/5.22 |
| 6,891,352 B2* | 5/2005 | Miyazaki et al. | 320/118 |
| 7,598,701 B2* | 10/2009 | Odaohhara | 320/106 |
| 7,821,383 B2* | 10/2010 | Sultan et al. | 340/426.13 |
| 7,894,810 B2* | 2/2011 | Feher | 455/420 |
| 8,463,562 B2* | 6/2013 | Nakanishi | 702/63 |
| 8,717,035 B2* | 5/2014 | Shook et al. | 324/433 |
| 2003/0015995 A1* | 1/2003 | Tamura et al. | 320/162 |
| 2003/0044689 A1* | 3/2003 | Miyazaki et al. | 429/320 |
| 2003/0062996 A1* | 4/2003 | Flanagan et al. | 340/457 |
| 2003/0087147 A1* | 5/2003 | Minamiura | 429/61 |
| 2003/0097207 A1* | 5/2003 | Landgraf et al. | 701/2 |
| 2004/0075532 A1* | 4/2004 | Ueda et al. | 340/5.72 |
| 2004/0239333 A1* | 12/2004 | Kikuchi | 324/434 |
| 2004/0257041 A1* | 12/2004 | Nagaoka | 320/128 |
| 2005/0195106 A1* | 9/2005 | Davis et al. | 342/357.08 |
| 2005/0219036 A1* | 10/2005 | Ueda et al. | 340/5.62 |
| 2005/0247775 A1* | 11/2005 | Gloekler et al. | 235/375 |
| 2006/0114100 A1* | 6/2006 | Ghabra et al. | 340/5.61 |
| 2007/0018613 A1* | 1/2007 | Miyazaki et al. | 320/116 |
| 2007/0060056 A1* | 3/2007 | Whitaker et al. | 455/41.2 |
| 2007/0076650 A1* | 4/2007 | Manjeshwar et al. | 370/328 |
| 2007/0135978 A1* | 6/2007 | Kim et al. | 701/29 |
| 2008/0059000 A1* | 3/2008 | Hornick et al. | 700/297 |
| 2008/0106391 A1* | 5/2008 | Santavicca et al. | 340/426.36 |
| 2008/0246586 A1* | 10/2008 | Hiramine | 340/5.72 |
| 2008/0266051 A1* | 10/2008 | Taki et al. | 340/5.1 |
| 2008/0315832 A1* | 12/2008 | Kondo | 320/110 |
| 2008/0318598 A1* | 12/2008 | Fry | 455/456.5 |
| 2009/0096576 A1* | 4/2009 | Oman et al. | 340/5.62 |
| 2009/0262254 A1* | 10/2009 | Reams | 348/734 |
| 2010/0004885 A1* | 1/2010 | Nakanishi | 702/63 |
| 2010/0007506 A1* | 1/2010 | Fischer | 340/636.1 |
| 2010/0022188 A1 | 1/2010 | Nakagawa | |
| 2010/0130127 A1 | 5/2010 | Takayama | |
| 2010/0144275 A1* | 6/2010 | Satou | 455/41.2 |
| 2010/0259611 A1* | 10/2010 | Keshavarzian et al. | 348/143 |
| 2011/0148425 A1* | 6/2011 | Shook et al. | 324/433 |
| 2011/0187513 A1* | 8/2011 | Taki et al. | 340/13.25 |
| 2011/0248679 A1* | 10/2011 | Tien et al. | 320/120 |
| 2011/0257817 A1* | 10/2011 | Tieman | 701/2 |
| 2011/0313595 A1* | 12/2011 | Kato | 701/2 |
| 2012/0093334 A1* | 4/2012 | Schreuder et al. | 381/74 |
| 2012/0164989 A1* | 6/2012 | Xiao et al. | 455/414.1 |
| 2012/0253717 A1* | 10/2012 | Ito et al. | 702/63 |
| 2012/0256598 A1* | 10/2012 | Hsu et al. | 320/148 |
| 2012/0258728 A1* | 10/2012 | Seal et al. | 455/456.1 |
| 2012/0303182 A1* | 11/2012 | Choi | 701/2 |
| 2013/0113428 A1* | 5/2013 | Emori et al. | 320/118 |
| 2013/0338950 A1* | 12/2013 | Joe et al. | 702/63 |

FOREIGN PATENT DOCUMENTS

| | | |
|---|---|---|
| JP | 2006-221477 A | 8/2006 |
| JP | 2007-046395 A | 2/2007 |
| JP | 2008-291422 A | 12/2008 |
| JP | 2010-018976 A | 1/2010 |
| JP | 2010-028753 A | 2/2010 |
| JP | 2010-130310 A | 6/2010 |
| JP | 4496511 B2 | 7/2010 |
| JP | 2011-087058 A | 4/2011 |
| JP | 2012-015622 A | 1/2012 |
| WO | 2006090460 A1 | 8/2006 |

OTHER PUBLICATIONS

Patent Abstracts of Japan for Japanese Publication No. 06-131590, publication date May 13, 1994 (1 page).

Japanese Office Action for Application No. 2012-052336, mailed on Jul. 8, 2014 (15 page).

* cited by examiner

COMMUNICATION SYSTEM AND PORTABLE MACHINE

BACKGROUND OF THE INVENTION

1. Technical Field

The present invention relates to a communication system and a portable machine, and in particular to a communication system and a portable machine which are related to respective three nodes of a controlled object such as a vehicle, a portable machine, and a portable terminal.

2. Related Art

Currently, systems are generally known, in which a vehicle portable machine (hereinafter, referred to as an "FOB") of a vehicle user communicates with a vehicle through radio waves. Existing portable terminals, such as portable phones or smartphones, are equipped with a function of relatively short-distance communications, including Bluetooth™ and Near Field Communication (NFC). With this function, wireless communications are widely conducted between a portable terminal and a vehicle or an FOB (for example, see JP 4496511 B1).

Such a wireless communication function is also used to acquire information from a vehicle or operate the vehicle.

For example, U.S. Pat. No. 7,821,383 discloses a technique in which a portable terminal acquires various information regarding a state of a vehicle, such as a voltage drop of a battery, or someone's intrusion into the vehicle, and displays the acquired information on the screen.

JP 2007-046395 A discloses a vehicle information setting device, which conducts wireless communications with a vehicle by using a portable phone as an interface through an FOB, and displays information regarding the vehicle. In addition, the vehicle information setting device is configured to set and control on-board apparatuses (for example, locking or unlocking of the doors).

Unfortunately, there are cases where the communication apparatus, such as an FOB or a portable terminal, communicates with the partner more than necessarily when both a communication apparatus and its partner are present within areas which electromagnetic waves reach. In this case, the communication apparatus may consume unnecessary electricity.

In consideration of such disadvantage, for example, JP 2010-130310 A discloses a communication device that aims to decrease the electricity consumption. The communication device is configured to transmit attribute information regarding a communication capacity thereof, and in turn receive attribute information regarding a communication capacity of a target. If the received attribute information indicates that the target is equipped with a communication function in a power saving mode, the communication device turns off the emission of an electromagnetic wave over a predetermined period after transmitting data.

JP 2010-028753 A discloses a communication device that aims to decrease the electricity consumption for proximity wireless communications. The communication device includes a proximity wireless communication device and an approaching detection unit that has lower electricity consumption than the proximity wireless communication device in an idle state. Then, the approaching detection unit detects a proximity state of another proximity wireless communication device or a removal from the proximity state thereof. When this proximity position state is detected, the communication device causes the proximity wireless communication device to be restored from a sleep state. Meanwhile, when the removal of the proximity state is detected, the communication device causes the proximity wireless communication device to enter the sleep state. Thus, the communication device causes the proximity wireless communication device to operate only when the proximity state is detected.

JP 06-131590 A discloses a movable body identification device that completes communications with a response unit moving at a high speed with a single communication sequence, and therefore does not more than necessarily conduct communications. In the movable body identification device, when the response unit enters a beam area of a question unit and receives an activation command, it transmits an activation response to the question unit. In turn, when receiving this activation response, the question unit transmits an operation command. When receiving the operation command, the response unit performs a predetermined operation, and then transmits an operation response. After that, the response unit receives a termination command indicating the termination of a series of communication sequences, and then enters a reception inhibition state over a predetermined period.

WO 2006/090460 A discloses a portable information terminal, which is a portable communication apparatus such as a portable phone and which enables application software to be activated through a simple user's operation. The portable information terminal is equipped with a reader (receiver) of a wireless IC tag. When being placed near the wireless IC tag, the portable information terminal reads information from the wireless IC tag. Then, the portable information terminal automatically activates an application related to this information, and displays it on the screen.

In many cases, however, an FOB and a portable terminal are held together, for example, in a user's pocket or bag. In such cases, an FOB and a portable terminal are likely to establish communications regardless of a user's intention and a screen of the portable terminal is maintained in an ON state. As a result, the unnecessary electricity may be consumed.

SUMMARY

One or more embodiments of the present invention provide a communication system and the like, which prevent communications from being conducted more than necessarily between an FOB and a portable terminal regardless of a user's intention, and which stops a screen of the portable terminal from more than necessarily remaining in an ON state, thereby decreasing the unnecessary electricity consumption.

In accordance with one aspect of the present invention, there is provided a communication system including: a portable machine that has an identification code registered in a controlled object and that can conduct wireless communications with the controlled object: and a portable terminal that can conduct noncontact wireless communications with the portable machine. In the communication system, after noncontact wireless communications start between the portable machine and the portable terminal communication unit, the noncontact wireless communications are inhibited when a predetermined condition is satisfied, and then do not resume unless a specified instruction is given.

With this configuration, the communication system can be provided, which prevents communications from being conducted more than necessarily between the portable machine and the portable terminal regardless of a user's intention, and which stops the screen of the portable terminal from more than necessarily remaining in the ON state if the screen of the portable terminal enters an ON state along with the start of the communications. Consequently, it is possible to decrease the unnecessary electricity consumption.

The portable terminal may include: a first transmission unit that transmits a first signal to the portable machine; and a first reception unit that receives a second signal from the portable machine. The portable machine may include: a second reception unit that receives the first signal which the first transmission unit has transmitted; a control unit that controls generation of the second signal, in relation to the first signal which the second reception unit has received; and a second transmission unit that transmits the second signal generated by the control unit to the first reception unit of the portable terminal. The portable terminal may inhibit the first transmission unit from transmitting the first signal, when the predetermined condition is satisfied.

With the above configuration, the unnecessary electricity consumption can be decreased, because the portable terminal detects the predetermined condition, and inhibits the communications.

When the predetermined condition is satisfied, the control unit of the portable machine may transmit a transmission inhibiting request signal for the first signal, in addition to the second signal. Then, when receiving the transmission inhibiting request signal, the portable terminal may inhibit the transmission of the first signal.

With the above configuration, the unnecessary electricity consumption can be decreased, because the portable machine detects the predetermined condition, and the portable terminal inhibits the communications.

The portable terminal may include: a first transmission unit that transmits a first signal to the portable machine; and a first reception unit that receives a second signal from the portable machine. The portable machine may include: a second reception unit that receives the first signal which the first transmission unit has transmitted; a control unit that controls generation of the second signal, in relation to the first signal which the second reception unit has received; and a second transmission unit that transmits the second signal generated by the control unit to the first reception unit of the portable terminal. The portable machine may inhibit the second transmission unit from transmitting the second signal, when the predetermined condition is satisfied.

With the above configuration, the unnecessary electricity consumption can be decreased, because the portable machine detects the predetermined condition, and inhibits the communications.

When noncontact wireless communications are established with the portable machine, the portable terminal may activate a predetermined application and exhibit a display for the application on a screen.

The above configuration allows a user to receive a notification, when the noncontact wireless communications are established.

The portable terminal may turn off the display on the screen, along with the inhibition of the noncontact wireless communications.

With the above configuration, the unnecessary electricity consumption can be decreased, because the display is automatically turned off on the screen, along with the inhibition of the communications.

After the noncontact wireless communications are inhibited, when receiving a user's operation for displaying the screen, the portable terminal may display, on the screen, a notification that the noncontact wireless communications have been inhibited and an operation method of giving the specified instruction.

This configuration allows the user to confirm the communication state, and be informed of a next possible operation.

The specified instruction may be a user's predetermined first operation with the portable terminal.

With the above configuration, the communications can be prevented from resuming regardless of a user's intention, because the communications resume in response to the user's predetermined operation.

When receiving the predetermined first operation, the portable terminal may display, on the screen, a notification that the noncontact wireless communications have been inhibited, and restarts noncontact wireless communications in response to a predetermined second operation.

The above configuration causes the resuming of the communications to conform to the user's intention, because the communications resume in response to the predetermined operation after the user confirms the communication state.

The portable terminal may recognize a user's operation, as the specified instruction, and cause the first transmission unit to resume transmitting the first signal.

With this configuration, the noncontact wireless communications can resume promptly, in response to the user's operation.

When receiving the second signals prescribed times within a predetermined period, the portable terminal may determine that the predetermined condition is satisfied.

With this configuration, the portable terminal can inhibit the noncontact communications, after the portable machine reliably confirms a state where the noncontact communications are to be inhibited.

When receiving the first signals prescribed times within a predetermined period, the portable machine may determine that the predetermined condition is satisfied.

With this configuration, the portable machine can inhibit the noncontact communications, after the portable terminal reliably confirms a state where the noncontact communications are to be inhibited.

In accordance with another aspect of the present invention, there is provided a portable machine that has an identification code registered in a controlled object and that can conduct wireless communications with the controlled object and noncontact wireless communication with the portable terminal. In the portable machine, after noncontact wireless communications start with the portable terminal, the noncontact wireless communications are inhibited when a predetermined condition is satisfied, and then do not resume unless a specified instruction is given.

With this configuration, the portable machine can be provided, which prevents communications from being conducted more than necessarily between the portable machine and the portable terminal regardless of a user's intention, and which stops the screen of the portable terminal from more than necessarily remaining in the ON state if the screen of the portable terminal enters an ON state along with the start of the communications. It is thus possible to decrease the unnecessary electricity consumption.

The portable machine may include: a reception unit that receives a first signal which the portable terminal has transmitted; a control unit that controls generation of a second signal, in relation to the first signal which the reception unit has received; and a transmission unit that transmits the second signal generated by the control unit to the portable terminal. The portable machine may inhibit the transmission unit from transmitting the second signal, when the predetermined condition is satisfied.

With the above configuration, the unnecessary electricity consumption can be decreased, because the portable machine detects the predetermined condition, and inhibits the communications.

When the predetermined condition is satisfied, the control unit may transmit a transmission inhibiting request signal for the first signal, in addition to the second signal.

With the above configuration, the unnecessary electricity consumption can be decreased, because the portable machine detects the predetermined condition, and inhibits the communications.

The portable machine may further include a user's operation reception unit, and the specified instruction may be a user's predetermined operation with the user's operation reception unit.

With the above configuration, the communications can be prevented from resuming regardless of a user's intention, because the communications resume in response to the user's predetermined operation with the portable machine.

As described above, a communication system and a portable machine can be provided, which prevent communications from being conducted more than necessarily between a portable machine (FOB) and the portable terminal regardless of a user's intention, and which stop a screen of the portable terminal from more than necessarily remaining in an ON state. Consequently, it is possible to decrease the unnecessary electricity consumption.

BRIEF DESCRIPTION OF THE DRAWINGS

more specifically, FIG. 7A is a flowchart of a process performed by the portable terminal, and FIG. 7B is a flowchart of a process performed by the portable machine.

DETAILED DESCRIPTION

Hereinafter, an embodiment of the present invention will be described, with reference to the accompanying drawings.

First Embodiment

Figure 1:
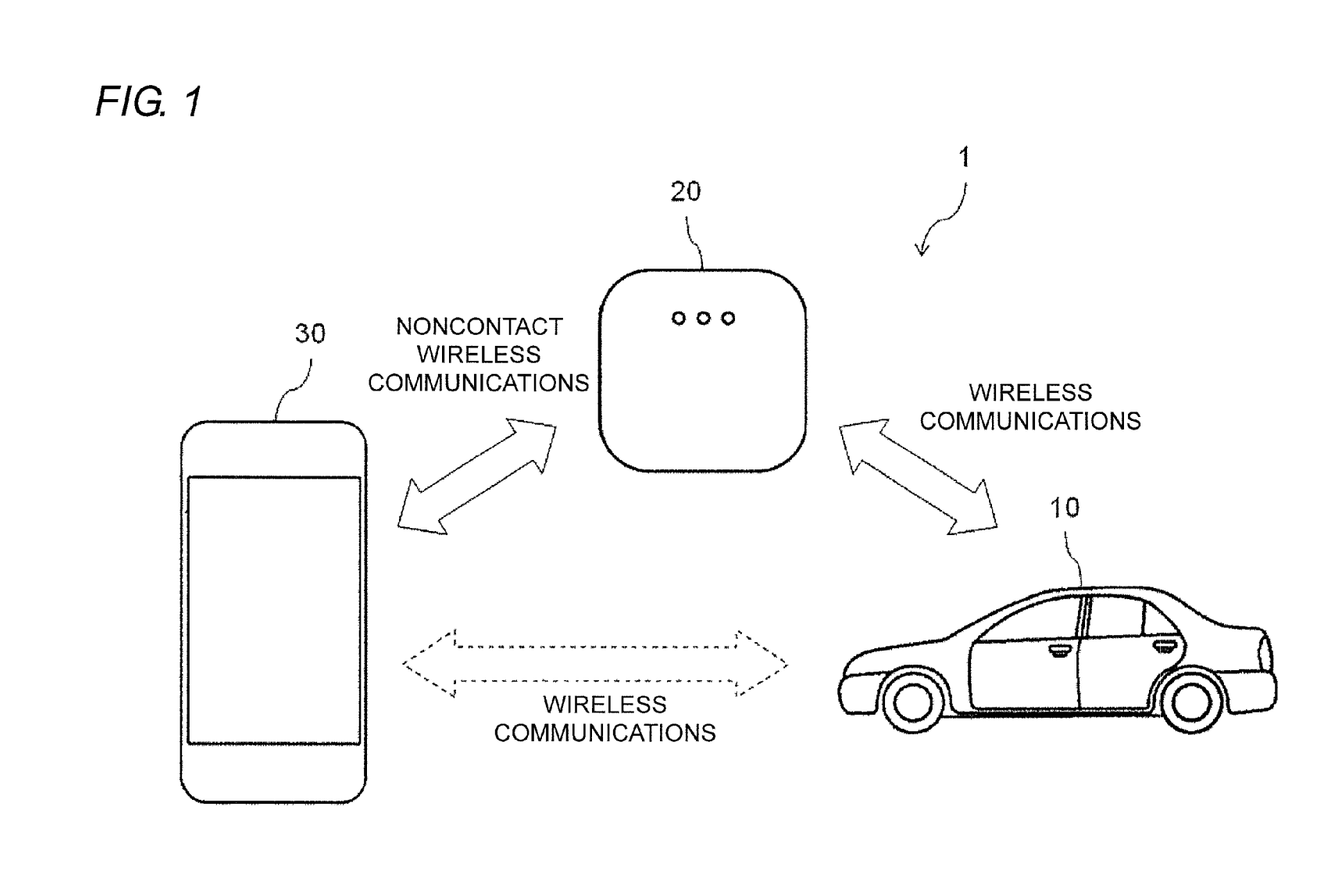
FIG. 1 is a conceptual view illustrating a communication system according to a first embodiment of the present invention.

FIG. 1 is a conceptual view illustrating a communication system 1 according to a first embodiment of the present invention. The communication system 1 includes a vehicle 10, a portable machine 20, and a portable terminal 30.

The vehicle 10 and the portable machine 20 conduct wireless communications with each other by using, for example, LF (low frequency) or UHF (ultra high frequency) radio waves, and each of them transmits/receives various commands, information, and the like through the communications. Because the portable machine 20 functions as a key of the vehicle 10, for example, a highly secure, distinctive communication scheme is applied to communications between the vehicle 10 and the portable machine 20.

The portable machine 20 and the portable terminal 30 conduct noncontact wireless communications with each other whose maximum communication distance is approximately several centimeters, and each of them transmits/receives various commands, information, and the like through the communications. For a scheme of communications between the portable machine 20 and the portable terminal 30, a typical communication standard may be utilized, including: an NFC (Near Field Communication) that conforms to a communication standard, such as Felica™, MIFARE™, applied to, for example, RFID communications or the like, namely, short-distance wireless communications; and infra-red communications, such as IrDA DATA. Because both of the portable machine 20 and the portable terminal 30 are typically held and used by a single user, noncontact wireless communications with a short maximum communication distance are enough.

The portable terminal 30 and the vehicle 10 directly conduct wireless communications with each other in accordance with a typical communication standard, such as NFC, infra-red communications, Bluetooth™, an internet connection (Wi-Fi, etc.), or a telephone line (W-CDMA, etc.), and each of them may selectively transmit/receive various commands, information, and the like through the communications. A communication distance between the portable terminal 30 and the vehicle 10 may be longer than that between the portable machine 20 and the vehicle 10. Therefore, a telephone line or an increasingly popularized internet connection is used for the communications therebetween, in addition to a short-distance wireless communication scheme. As a result, even when the vehicle 10 parks in an underground parking area where the UHF communications cannot be established from the portable machine 20 to the vehicle 10, the portable terminal 30 can directly communicate with the vehicle 10 through a telephone line or an internet connection.

The portable machine 20 is equipped with a function of a key unique to the vehicle 10, and an identification code unique to the portable machine 20 is registered with the vehicle 10. The portable machine 20 has functions of, for example, a typically physical key of the vehicle 10, or an entry key of a smart entry system. In more detail, when the door of the vehicle 10 is locked or unlocked with the operation of a switch or the like near a door of the vehicle 10, when the vehicle 10 and the portable machine 20 enter a state of being able to communicate with each other, or when a user operates the portable machine 20, this situation triggers the portable machine 20 to, for example, acquire vehicle information from the vehicle 10.

The portable machine 20 also has a function of relaying the communications between the vehicle 10 and the portable terminal 30. In more detail, the portable machine 20 can receive a command, information, or the like transmitted from the vehicle 10, and forward it to the portable terminal 30. Likewise, the portable machine 20 can receive a command, information, or the like transmitted from the portable terminal 30, and forward it to the vehicle 10.

There is no specific limitation on a type of the portable terminal 30, as long as it is a portable apparatus which: enables noncontact wireless communications with the portable machine 20; can acquire and display vehicle information; contains a predetermined executable application program for operating the vehicle 10 (hereinafter, referred to as "vehicle program"); and is provided with a display unit for displaying the vehicle information. Examples of the portable terminal 30 include a portable phone, a smartphone, a portable information terminal (PDA), a portable music player, and a portable game machine. In addition, examples of the "vehicle information" include a locked state of each door, a remaining amount of fuel, a remaining battery level, an elapsed time since the last charge, an ON/OFF state of lamps, a temperature in a vehicle room, a temperature surrounding a vehicle, and a location of a vehicle.

Figure 2:
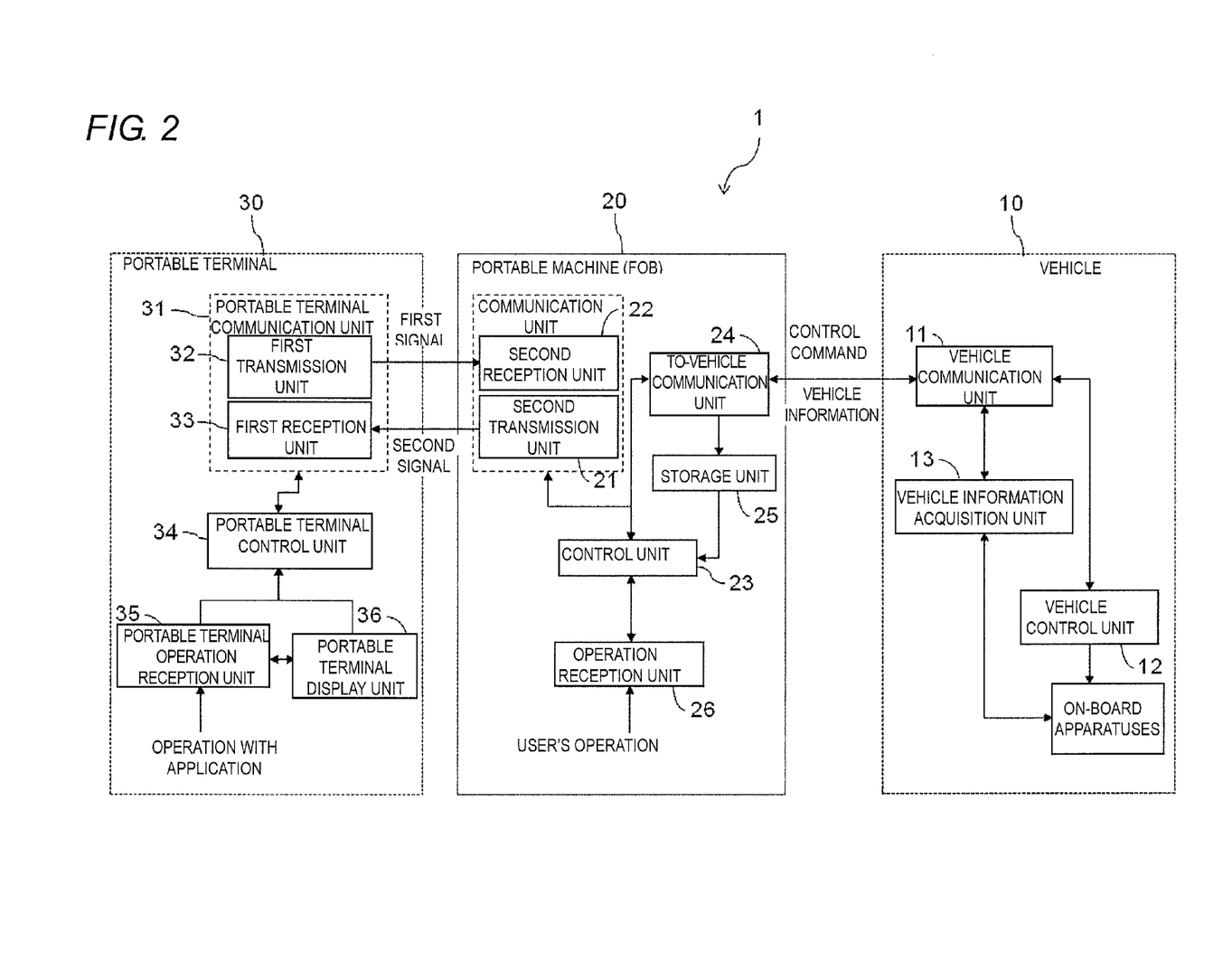
FIG. 2 is a block diagram of a functional configuration of the communication system according to the first embodiment of the present invention.

FIG. 2 is a block diagram of a functional configuration of the communication system 1 of this embodiment. First, a description will be given of an outline of a process performed between the vehicle 10 and the portable machine 20, with reference to FIG. 2. The communication system 1 includes the portable machine 20 that can conduct wireless communications with the vehicle 10, and a portable terminal 30 that can conduct noncontact wireless communications with the portable machine 20. When a user performs a command operation that instructs the acquisition of vehicle information or the control of the vehicle 10 with the portable machine 20 or the portable terminal 30, this command is transmitted from a to-vehicle communication unit 24 of the portable machine 20 to a vehicle communication unit 11 of the vehicle 10. On the basis of this transmitted command, in the vehicle 10, a vehicle control unit 12 controls a corresponding on-board apparatus, or a vehicle information acquisition unit 13 acquires corresponding vehicle information. Then, the vehicle 10 transmits the controlled result or acquired vehicle information to the to-vehicle communication unit 24 of the portable machine 20 from the vehicle communication unit 11. As a result, the portable machine 20 stores the controlled result or vehicle information in a storage unit 25.

After the portable machine 20 acquires the vehicle information from the vehicle 10 in the above manner, when the portable machine 20 and the portable terminal 30 are present within a distance over which noncontact wireless communications are available, they conduct the noncontact wireless communications. Once starting between the portable machine 20 and a portable terminal communication unit 31 in accordance with a predetermined protocol, the noncontact wireless communications are established therebetween unless any specific problem occurs. It should be noted that a protocol of starting and establishing NFC communications (noncontact wireless communications) between the portable machine 20 and the portable terminal 30 will be described later.

Both of the portable machine 20 and the portable terminal 30 are configured to be held and carried by a user. For example, in many cases, the user carries the portable machine 20 and the portable terminal 30 while holding them in the same pocket or bag. In this case, while the portable machine 20 and the portable terminal communication unit 31 are kept, for example, in a user's bag or pocket within a distance over which the noncontact wireless communications are available, the noncontact wireless communications are continuously conducted therebetween. However, after the noncontact wireless communications start between the portable machine 20 and the portable terminal communication unit 31 that are present within a distance over which the noncontact wireless communications are available, the communication system 1 inhibits the noncontact wireless communications when a predetermined condition is satisfied, and then does not resume them unless a specified instruction is given.

The above configuration prevents the communications from being conducted more than necessarily between the portable machine 20 and the portable terminal 30 regardless of a user's intention. On the other hand, when the noncontact wireless communications start, the portable terminal 30 indicates the establishment of the communications on the screen by turning ON, for example, an LED lamp for screen display. Therefore, while the noncontact wireless communications are being conducted, the screen of the portable terminal 30 is maintained in an ON state since the start of the communications. In this case, however, the communication system 1 can prevent the screen from remaining in the ON state. Consequently, it is possible for the communication system 1 to decrease the unnecessary electricity consumption.

More specifically, the portable terminal 30 of the communication system 1 includes a first transmission unit 32 that transmits a first signal to the portable machine 20, and a first reception unit 33 that receives a second signal from the portable machine 20. The portable machine 20 includes: a second reception unit 22 that receives the first signal that the first transmission unit 32 has transmitted; a control unit 23 that controls generation of the second signal, in relation to the first signal which the second reception unit 22 has received; and a second transmission unit 21 that transmits the second signal generated by the control unit 23 to the first reception unit 33 of the portable terminal 30.

The portable terminal 30 may inhibit the first transmission unit 32 from transmitting the first signal, when the predetermined condition is satisfied. Specifically, unless the portable terminal 30 transmits the first signal for calling the portable machine 20, noncontact wireless communications do not start between the portable terminal 30 and the portable machine 20. Thus, the portable terminal 30 detects the predetermined condition and inhibits the communications, so that the unnecessary electricity consumption can be decreased.

Alternatively, the portable machine 20 may inhibit the second transmission unit 21 from transmitting the second signal, when the predetermined condition is satisfied. Unless the portable machine 20 transmits the second signal that is a response to the call from the portable terminal 30, no noncontact wireless communication is established. Thus, the portable machine 20 detects the predetermined condition and inhibits the communications, so that the unnecessary electricity consumption can be decreased.

When the predetermined condition is satisfied, the control unit 23 of the portable machine 20 may transmit a transmission inhibiting request signal for the first signal, in addition to the second signal. When receiving this transmission inhibiting request signal, the portable terminal 30 may inhibit the transmission of the first signal. Thus, the portable machine 20 detects the predetermined condition, and the portable terminal 30 inhibits the communications, so that the unnecessary electricity consumption can be decreased.

It should be noted that the expression "the predetermined condition" refers to, for example, a case where the noncontact wireless communications are successfully established prescribed times or more within a predetermined period, a case where the noncontact wireless communications stay established over a predetermined period or longer, or a case where a vehicle program is displayed on the screen of the portable terminal 30 and a user does not operate the portable terminal 30 over a predetermined period or longer. The detail thereof will be described later.

For example, it is assumed that while a battery of the vehicle 10 is being charged at a power supply station, a user attempts to acquire vehicle information indicating how much the battery is charged, by operating the portable terminal 30, in order to confirm the charging state of the battery. When the user places the portable terminal 30 next to the portable machine 20 or puts the portable terminal 30 on the portable machine 20, noncontact wireless communications are established therebetween. In response, the portable terminal 30 activates the vehicle program that is a predetermined application, and displays the image of this application on a portable terminal display unit 36. In this way, the image of the application is automatically displayed simply by arranging the portable machine 20 and the portable terminal 30 close to each other. As a result, the user can promptly perform a desired operation or confirm desired vehicle information.

Next, when performing a command operation with a portable terminal operation reception unit 35, in which information regarding the charging state of the battery is acquired from the vehicle 10 through the application, the user can acquire this information from the portable machine 20. Here, a portable terminal control unit 34 controls interfaces between the portable terminal communication unit 31 and the portable terminal operation reception unit 35 and between the portable terminal communication unit 31 and the portable terminal display unit 36, in relation to the application.

The user confirms the acquired charging state of the battery, and leaves the portable terminal 30 next to the portable machine 20. In this case, the portable terminal 30 maintains the noncontact wireless communications with the portable machine 20. However, when the noncontact wireless communications stay established over a predetermined period or longer, the portable terminal 30 or the portable machine 20 inhibits the noncontact wireless communications.

Figure 3:
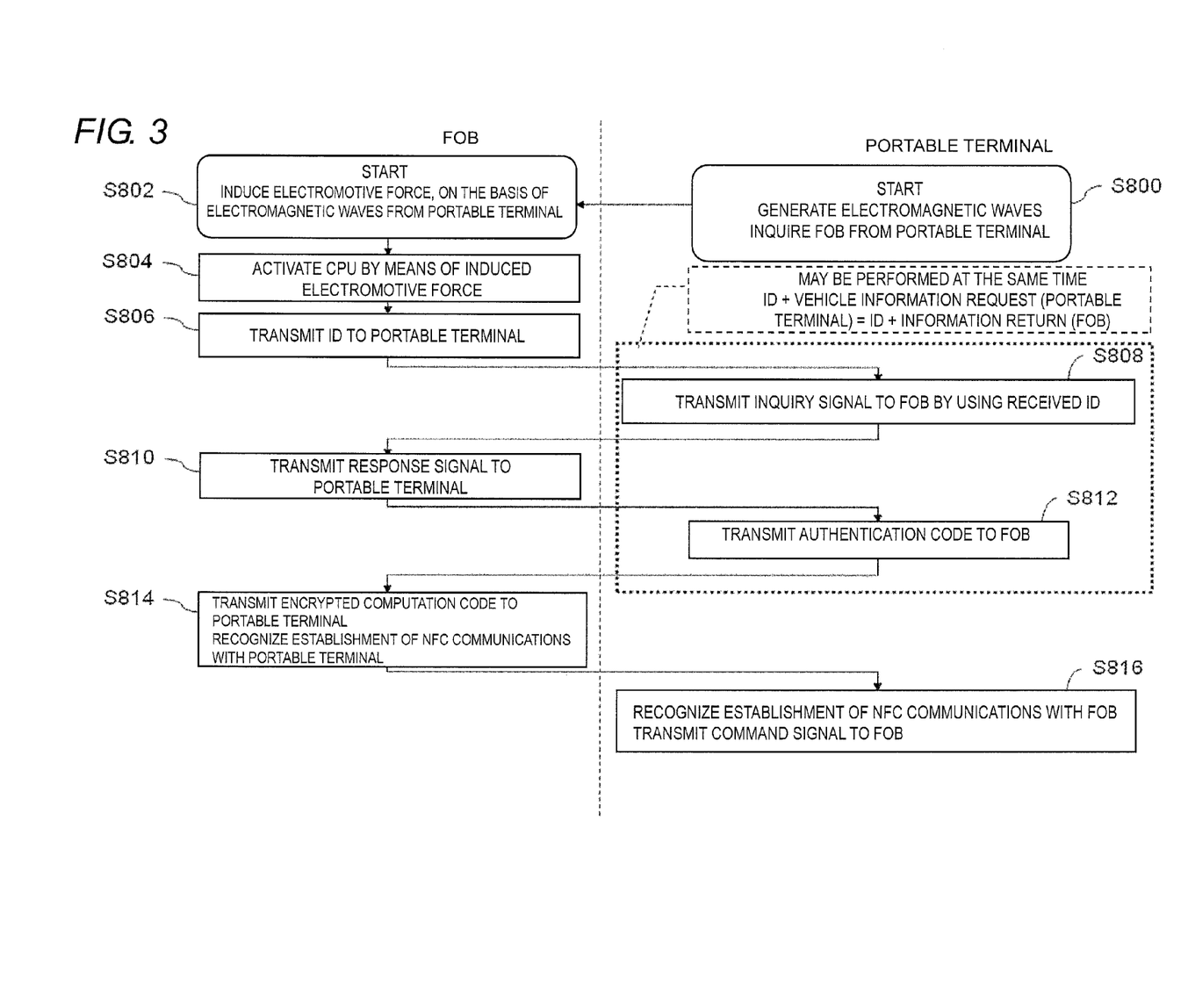
FIG. 3 is an explanatory flowchart of a process of establishing NFC communications between a portable machine and a portable terminal.
Figure 4:
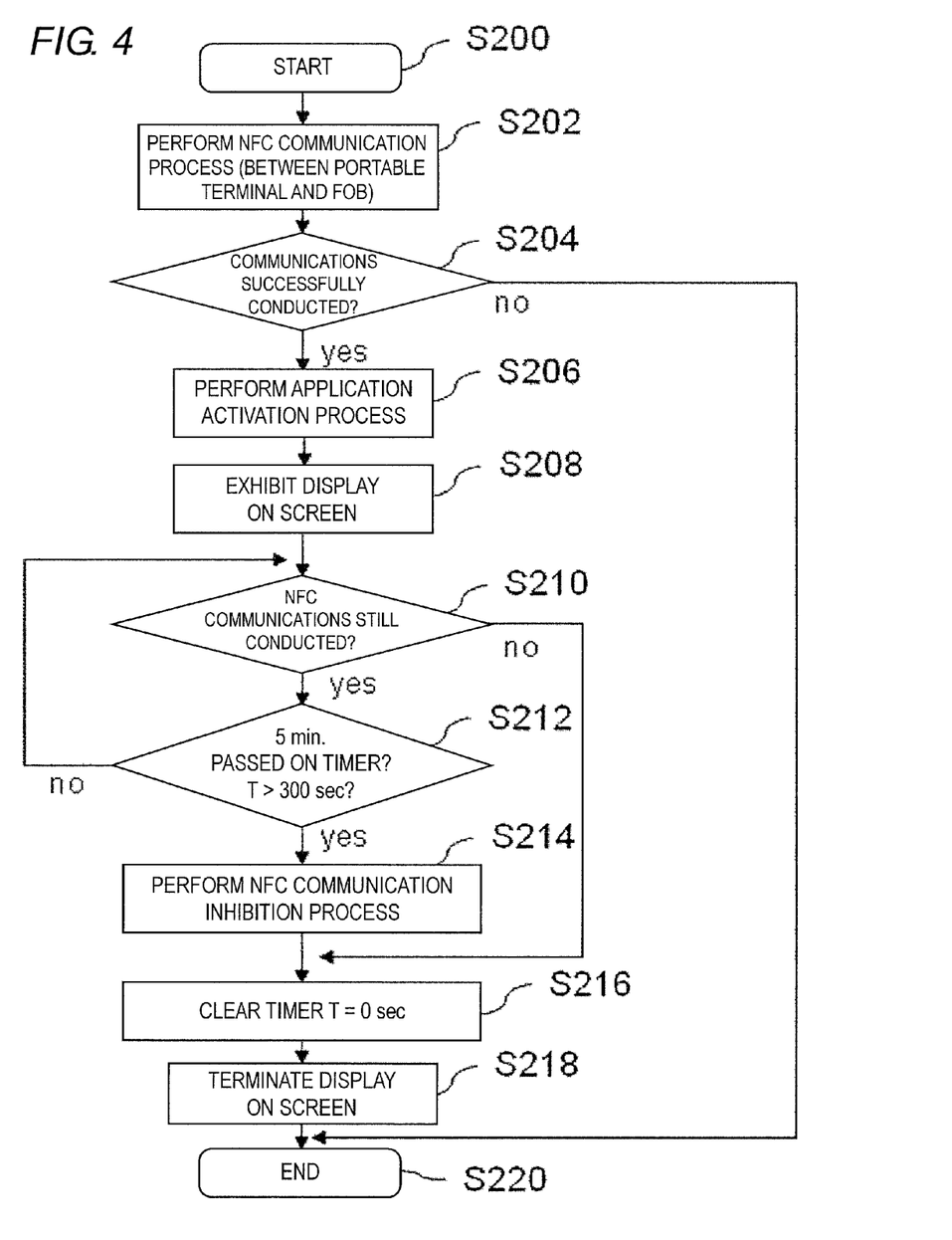
FIG. 4 is a flowchart of a process performed by the portable terminal in the communication system according to the first embodiment of the present invention, in which the NFC communications are inhibited between the portable machine and the portable terminal, when staying established over a predetermined period or longer.

The above process of inhibiting the noncontact wireless communications will be described, with reference to FIGS. 3 and 4. FIG. 3 is an explanatory flowchart of a process from the start to establishment of typical NFC communications (noncontact wireless communications) between the portable machine 20 and the portable terminal 30. FIG. 4 is a flowchart of a process performed by the portable terminal 30, in which the NFC communications are inhibited between the portable machine 20 and the portable terminal 30, when staying established over a predetermined period or longer.

Referring to FIG. 3, first, the establishment of the NFC communications will be described. At S800, the portable terminal 30 that is equipped with the portable terminal communication unit 31 having an NFC reader/writer function generates electromagnetic waves at regular intervals. Each electromagnetic wave corresponds to the first signal with which the portable terminal communication unit 31 calls the portable machine 20. Then, the portable terminal 30 inquires whether or not the portable machine 20 is present within an area where they can communicate with each other. In this embodiment, a frequency of the electromagnetic wave may be 13.56 MHz, but needless to say, there is no limitation on the frequency of the electromagnetic wave.

If the portable machine 20 is present at a location to receive the electromagnetic waves, at S802, the portable machine 20 induces an electromotive force, on the basis of the electromagnetic waves. At S804, the portable machine 20 activates a CPU thereof by means of the induced electromotive force. Once the CPU is activated, at S806, the portable machine 20 transmits a unique identification code thereof to the portable terminal 30, thereby responding to the inquiry of the portable terminal 30. In the case of inhibiting the transmission of the second signal, when determining that the predetermined condition is satisfied despite the activation of the CPU, the control unit 23 of the portable machine 20 does not transmit the second signal that is a response to the calling from the portable terminal 30, without performing the process of S806.

At S808, upon receiving the response, the portable terminal 30 transmits an inquiry signal to the portable machine 20 by using the received identification code. At S810, upon receiving the inquiry signal, the portable machine 20 transmits a response signal to the portable terminal 30. At S812, upon receiving the response signal, the portable terminal 30 transmits an authentication code to the portable machine 20.

At S814, upon receiving the authentication code, the portable machine 20 transmits an encrypted computation code to the portable terminal 30, and recognizes that the NFC communications have been successfully established with the portable terminal 30. At S816, upon receiving the encrypted computation code, the portable terminal 30 recognizes that the NFC communications have been successfully established with the portable machine 20. Eventually, the portable terminal 30 transmits a command signal to the portable machine 20.

Accordingly, the expression "the NFC communications have been successfully established" refers to a fact that both of the portable machine 20 and the portable terminal 30 have recognized the establishment of the NFC communications through processes of S800 to S816. It should be noted that both processes of S808 and S812 may be performed at the same time.

Next, a description will be given of a process in which the portable terminal 30 inhibits the noncontact wireless communications, when the noncontact wireless communications stay established over a predetermined period or longer, with reference to FIG. 4. When the user places the portable terminal 30 next to the portable machine 20, at S202, the portable terminal 30 and the portable machine 20 perform the processes, as described above, of S800 to S816. When the process proceeds to S816 at S204, if the portable terminal 30 recognizes that the NFC communications have been successfully established, the process proceeds to S206. Otherwise, if the portable terminal 30 does not recognize it, any process is no longer performed.

If the NFC communications have been successfully established ("YES" at S204), at S206, the portable terminal 30 activates a vehicle program that is a predetermined application. At S208, the portable terminal 30 displays the image of the application on the portable terminal display unit 36. When acquiring a charging state of the battery, the portable terminal 30 displays this state. After that, the user leaves the portable terminal 30 for a while. At S210, the portable terminal 30 checks whether or not the NFC communications are still conducted. Then, if the user leaves the portable terminal 30 next to the portable machine 20 without operating it, the NFC communications will be continuously conducted without being broken off. Therefore, the process proceeds to S212.

At S212, the portable terminal 30 keeps checking whether or not the NFC communications are still conducted until, for example, five minutes pass since the establishment of the NFC communications. If the NFC communications are never broken off for five minutes or longer, at S214, the NFC communications are inhibited from being conducted. Specifically, in the case where the portable terminal 30 inhibits the NFC communications, the portable terminal 30 stops generating electromagnetic waves at the start of the NFC communications. In this case, the processes starting from S800 are not performed. Otherwise, in the case where the portable machine 20 inhibits the NFC communications, the portable machine 20 inhibits the interrupt in the NFC communications.

When the NFC communications are inhibited, at S216, a timer is cleared. It should be noted that in the case of checking whether or not the NFC communications are still conducted at S210, even if the user moves the portable terminal 30 from the area neighboring the portable machine 20 and therefore the NFC communications are broken off ("NO" at S210), the timer is cleared at S216. Moreover, if the NFC communications are not successfully established at S204 ("NO" at S204), the process is no longer performed.

Figure 5:
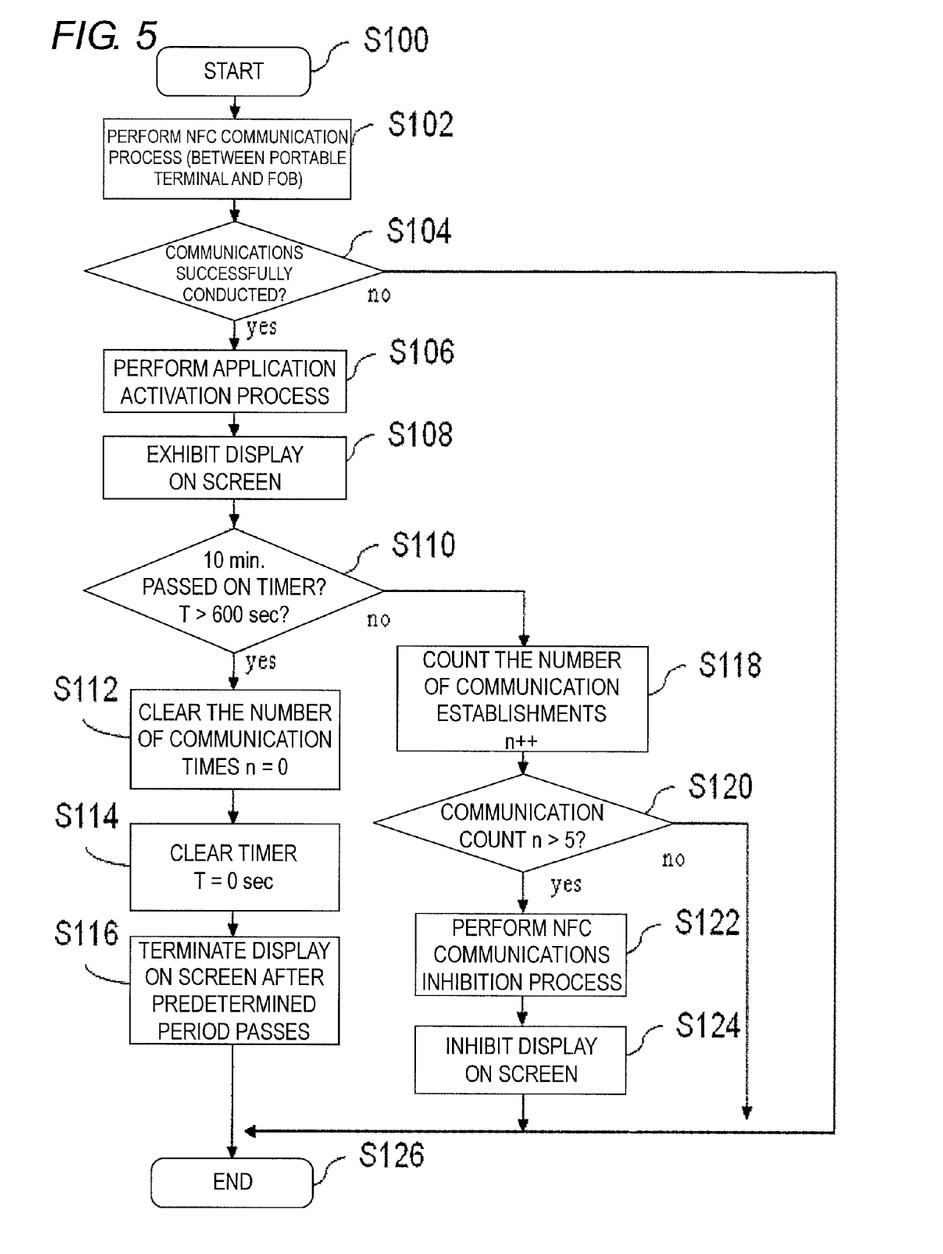
FIG. 5 is a flowchart of a process performed by the portable terminal in the communication system according to the first embodiment of the present invention, in which the NFC communications are inhibited between the portable machine and the portable terminal, when the NFC communications have been established prescribed times or more within a predetermined period.

Next, description will be given of a process in which the portable terminal 30 inhibits the noncontact wireless communications, when the noncontact wireless communications are established prescribed times or more within a predetermined period, with reference to FIG. 5. For example, it is assumed that the user picks up the portable terminal 30 placed next to the portable machine 20 with his/her hand, and is moving it. During this time, the NFC communications are not maintained but are established intermittently. Hereinafter, a description that overlaps that having been given with reference to FIG. 4 will be omitted as appropriate. Processes of S100 to A108 are the same as those of S200 to S208, respectively.

The timer starts at S110, if, for example, ten minutes have not passed since the NFC communications are established once ("NO" at S110), at S118, the number of times in which the NFC communications have been successfully established, namely, the processes of S800 to S816 have been performed is counted up. The timer may be counted by an interrupt process. If the counted number is less than five at S120 ("NO" at S120), the portable terminal 30 repeats the processes of S104 to S118. Otherwise, if the count becomes five or more ("YES" at S120), the portable terminal 30 inhibits the NFC communications.

Alternatively, if receiving the second signals from the portable machine 20 prescribed times within a predetermined period, the portable terminal 30 may determine that the predetermined condition is satisfied, and inhibit the NFC communications. With this processing, after the portable machine 20 reliably confirms a state where the noncontact wireless communications are to be inhibited, the portable terminal 30 can inhibit it. Alternatively, likewise, as for the portable machine 20, if receiving the first signals from the portable terminal 30 prescribed times within a predetermined period, the portable machine 20 may determine that the predetermined condition is satisfied, and inhibit the NFC communications. With this processing, after the portable terminal 30 reliably confirms a state where the noncontact wireless communications are to be inhibited, the portable machine 20 can inhibit it.

Furthermore, the portable terminal 30 turns OFF the display on the screen, in addition to inhibiting the NFC communications, at S124. With this processing, the display is automatically turned OFF on the screen along with the inhibition of the communications, so that the unnecessary electricity consumption can be decreased. Displaying an image on the screen may become a main cause of consuming the electricity of a battery in the portable terminal 30, such as a portable phone or a smartphone. However, while the noncontact wireless communications are being inhibited, the display on the screen is maintained in an OFF state. As a result, the portable terminal 30 does not consume the electricity more than necessarily.

Moreover, when the user performs an operation of displaying any image after the inhibition of the NFC communications, the portable terminal 30 may display, on the portable terminal display unit 36, a notification that the NFC communications have been inhibited and an operation method of giving a specified instruction. This configuration allows the user to confirm the communication state, and be informed of a next possible operation.

Figure 6:
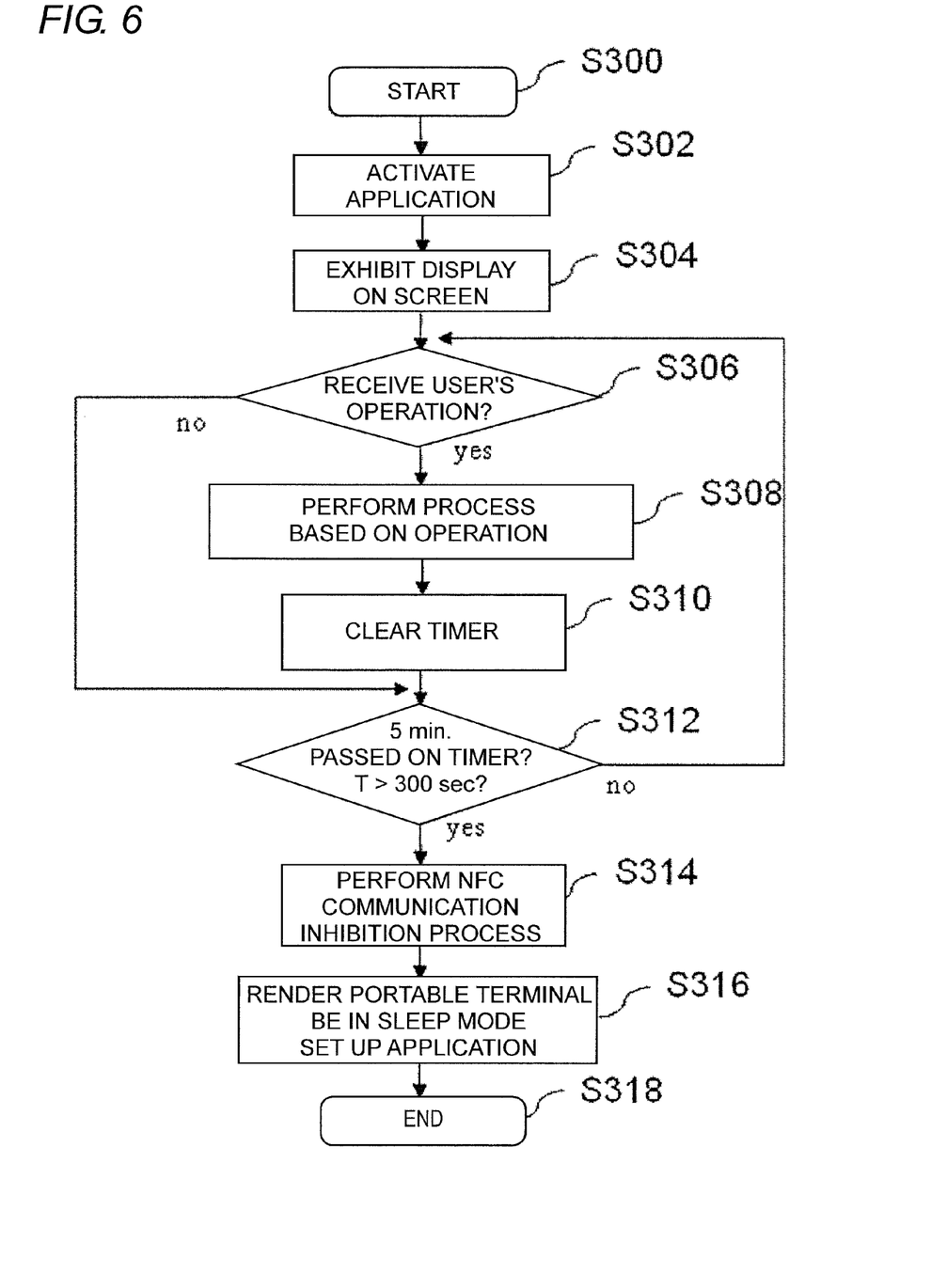
FIG. 6 is a flowchart of a process performed by the portable terminal in the communication system according to the first embodiment of the present invention, in which: after NFC communications are established between the portable machine and the portable terminal, a vehicle program exhibits a display on a screen of the portable terminal; and the NFC communications are inhibited when a user does not perform any operation over a predetermined period or longer.

Next, a description will be given of a process performed by the portable terminal 30, in which after the NFC communications are established between the portable machine 20 and the portable terminal 30 and then the vehicle program displays the image of an application on the screen of the portable terminal 30, the NFC communications are inhibited if the user does not perform any operation over a predetermined period or longer, with reference to FIG. 6. For example, it is assumed that the user picks up the portable terminal 30 placed next to the portable machine 20 with his/her hand, and randomly operates the portable terminal 30.

At S302, the user activates an application that is the vehicle program, and at S304, this application displays an image on the screen. If the user operates the application at S306 ("YES" at S306), this application performs a process based on the user's operation at S308. At S310, the timer is cleared, and the process proceeds to S312.

Otherwise, the user does not perform any operation at S306 ("NO" at S306), the process directly proceeds to S312. At S312, for example, the portable terminal 30 checks whether or not, for example, five minutes have passed with the timer. If this time period has not yet passed ("NO" at S312)", the portable terminal 30 repeats the processes of S306 to S310. Otherwise, if, for example, five minutes or longer have passed since the last operation ("YES" at S312), the portable terminal 30 inhibits the NFC communications at S314. At S316, because the user have not performed any operation over a predetermined period or longer, the screen of the portable terminal 30 is turned OFF and enters a sleep mode. In this case, when the user performs a next operation and the screen is turned ON, the portable terminal 30 may display a message indicating that the NFC communications are halted.

Figure 7A:
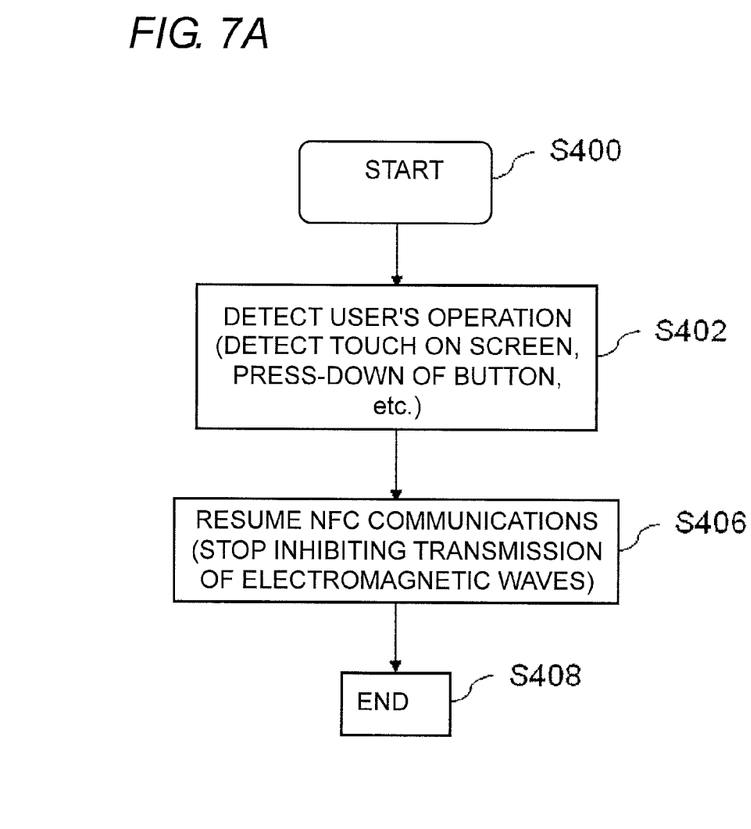
FIGS. 7A and 7B are flowcharts of a process performed by the communication system according to the first embodiment of the present invention, in which after being inhibited between the portable machine and the portable terminal, the NFC communications resume.
Figure 7B:
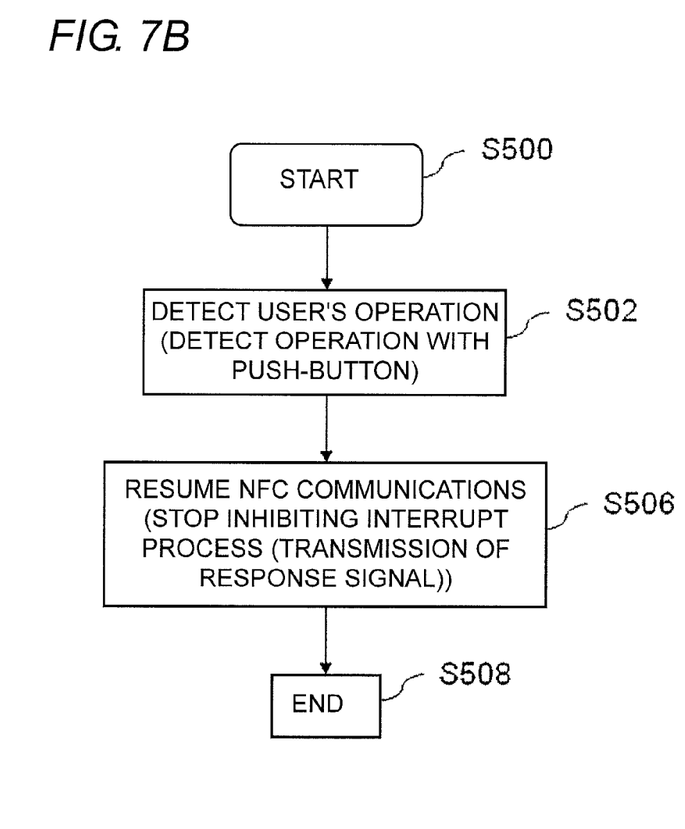

Next, a description will be given of a process of resuming the NFC communications between the portable machine 20 and the portable terminal 30 after the NFC communications are inhibited, with reference to FIGS. 7A and 7B. Specifically, FIG. 7A depicts a process performed by the portable terminal 30, and FIG. 7B depicts a process performed by the portable machine 20. In order to resume the NFC communications, a specified instruction is required. For example, it is assumed that the user leaves the portable terminal 30 next to the portable machine 20 over a long period, and the NFC communications are being inhibited therebetween.

The portable terminal 30 detects a user's touch on the screen or a user's operation at S402, and then resumes NFC communications, namely, stops inhibiting the transmission of electromagnetic waves at S403, thereby returning to a state where the process of S800 is to be performed.

In turn, the portable machine 20 detects a user' operation with the operation reception unit 26 at S502, and then resumes the NFC communications, namely, stops inhibiting the NFC interrupt process (the transmission of the response signal) at S506.

As described above, the specified instruction of resuming the NFC communications may be a user's predetermined operation with the portable terminal 30. The portable machine 20 and the portable terminal 30 resume communications in response to the user's predetermined operation, in the above manner, so that the communications can be prevented from resuming regardless of a user's intention. The specified instruction may be an instruction given by a phone call for the portable terminal 30. In this case, it is possible to give an instruction from a remote area.

Moreover, when the predetermined operation is performed, the portable terminal 30 may display, on the screen, a notification that the wireless communications have been inhibited, and resume the NFC wireless communications in response to a different predetermined operation following the previous operation. In this case, the user confirms the communication state, and then resumes the communications with a predetermined operation, so that the communications can be prevented from resuming regardless of a user's intention. For example, after confirming, with the previous operation, the notification that the NFC wireless communications have been inhibited, the user can resume the NFC wireless communications with the following predetermined different operation, for example, swiping the screen of the portable terminal 30 in a specific direction. Alternatively, if the user does not wish to resume it, he/she may perform a different operation. Consequently, the resuming of the NFC wireless communications conforms to the user's intention.

Furthermore, the portable terminal 30 may recognize any user's operation as the specified instruction, and cause the first transmission unit 32 to resume transmitting the first signal. With this configuration, the noncontact wireless communications can resume promptly, in response to the user's operation.

It should be noted that the present invention is not limited to the embodiment having been described, and configurations of the present invention may be contemplated without departing from the scopes described in the individual claims. In more detail, the present invention, in particular, the specific embodiment has been mainly illustrated and described, but those skilled in the art can apply various modifications to the shapes, the materials, the numbers, and the like of the individual detailed components in the above-described embodiments, without departing from the technical spirit and purpose of the present invention. Accordingly, the description, as disclosed above, that limits the shapes and the like is a simply illustrative example for facilitating the understanding of the present invention, and is not intended to limit the present invention. Therefore, descriptions of names of members, the limitations on shapes and the like of which are partially or entirely modified, are included in the present invention.

For example, in this embodiment, the controlled object is a vehicle, but there is no limitation on the controlled object. Alternatively, the controlled object is applicable to a house or garage.

What is claimed is:

1. A communication system comprising:
   a portable machine having an identification code registered in a controlled object, wherein the portable machine conducts wireless communications with the controlled object: and
   a portable terminal that conducts noncontact wireless communications with the portable machine,
   wherein the portable terminal includes:
      a first transmission unit transmitting a first signal to the portable machine; and
      a first reception unit receiving a second signal from the portable machine,
   the portable machine includes:
      a second reception unit receiving the first signal which the first transmission unit has transmitted;
      a control unit controlling generation of the second signal, in relation to the first signal which the second reception unit has received; and
      a second transmission unit transmitting the second signal generated by the control unit to the first reception unit of the portable terminal,
   wherein after noncontact wireless communications start between the portable machine and the portable terminal, the noncontact wireless communications are inhibited by inhibiting the first transmission unit from transmitting the first signal, in a case where the noncontact wireless communications are successfully established a prescribed number of times or more within a predetermined period, in a case where the noncontact wireless communications stay established over a predetermined period or longer, or in a case where a user does not operate the portable terminal over a predetermined period or longer, and then do not resume unless any user's operation to the portable terminal is given, or unless a phone call for the portable terminal is given.

2. The communication system according to claim 1,
   wherein, in a case where the noncontact wireless communications are successfully established the prescribed number of times or more within the predetermined period, or in a case where the noncontact wireless communications stay established over the predetermined period or longer, the control unit of the portable machine transmits the second signal and a transmission inhibiting request signal for inhibiting transmission of the first signal, and
   wherein, when receiving the transmission inhibiting request signal, the portable terminal inhibits the transmission of the first signal.

3. The communication system according to claim 1, wherein when noncontact wireless communications are established with the portable machine, the portable terminal activates a predetermined application and exhibits a display for the application on a screen.

4. The communication system according to claim 3, wherein the portable terminal turns off the display on the screen, along with the inhibition of the noncontact wireless communications.

5. The communication system according to claim 3, wherein after the noncontact wireless communications are inhibited, when receiving a user's operation for displaying the screen, the portable terminal displays, on the screen, a notification that the noncontact wireless communications have been inhibited and an operation method of giving the specified instruction.

6. The communication system according to claim 1,
   wherein, when receiving the any user's operation, the portable terminal displays, on the screen, a notification that the noncontact wireless communications have been inhibited, and restarts noncontact wireless communications in response to an operation other than the any user's operation.

7. A communication system comprising:
   a portable machine having an identification code registered in a controlled object, wherein the portable machine conducts wireless communications with the controlled object: and a portable terminal that conducts noncontact wireless communications with the portable machine, wherein after noncontact wireless communications start between the portable machine and the portable terminal, the noncontact wireless communications are inhibited when a predetermined condition is satisfied, and then do not resume unless a specified instruction is given, wherein when noncontact wireless communications are established with the portable machine, the portable terminal activates a predetermined application and exhibits a display for the application on a screen, and wherein the portable terminal turns off the display on the screen, along with the inhibition of the noncontact wireless communications.

8. A communication system comprising:

a portable machine having an identification code registered in a controlled object, wherein the portable machine conducts wireless communications with the controlled object: and a portable terminal that conducts noncontact wireless communications with the portable machine, wherein after noncontact wireless communications start between the portable machine and the portable terminal, the noncontact wireless communications are inhibited when a predetermined condition is satisfied, and then do not resume unless a specified instruction is given, wherein when noncontact wireless communications are established with the portable machine, the portable terminal activates a predetermined application and exhibits a display for the application on a screen, and wherein after the noncontact wireless communications are inhibited, when receiving a user's operation for displaying the screen, the portable terminal displays, on the screen, a notification that the noncontact wireless communications have been inhibited and an operation method of giving the specified instruction.

* * * * *